E. C. BALDWIN.
PAPER CUP DISPENSER.
APPLICATION FILED AUG. 2, 1916.
Reissued Oct. 31, 1916. 14,209.
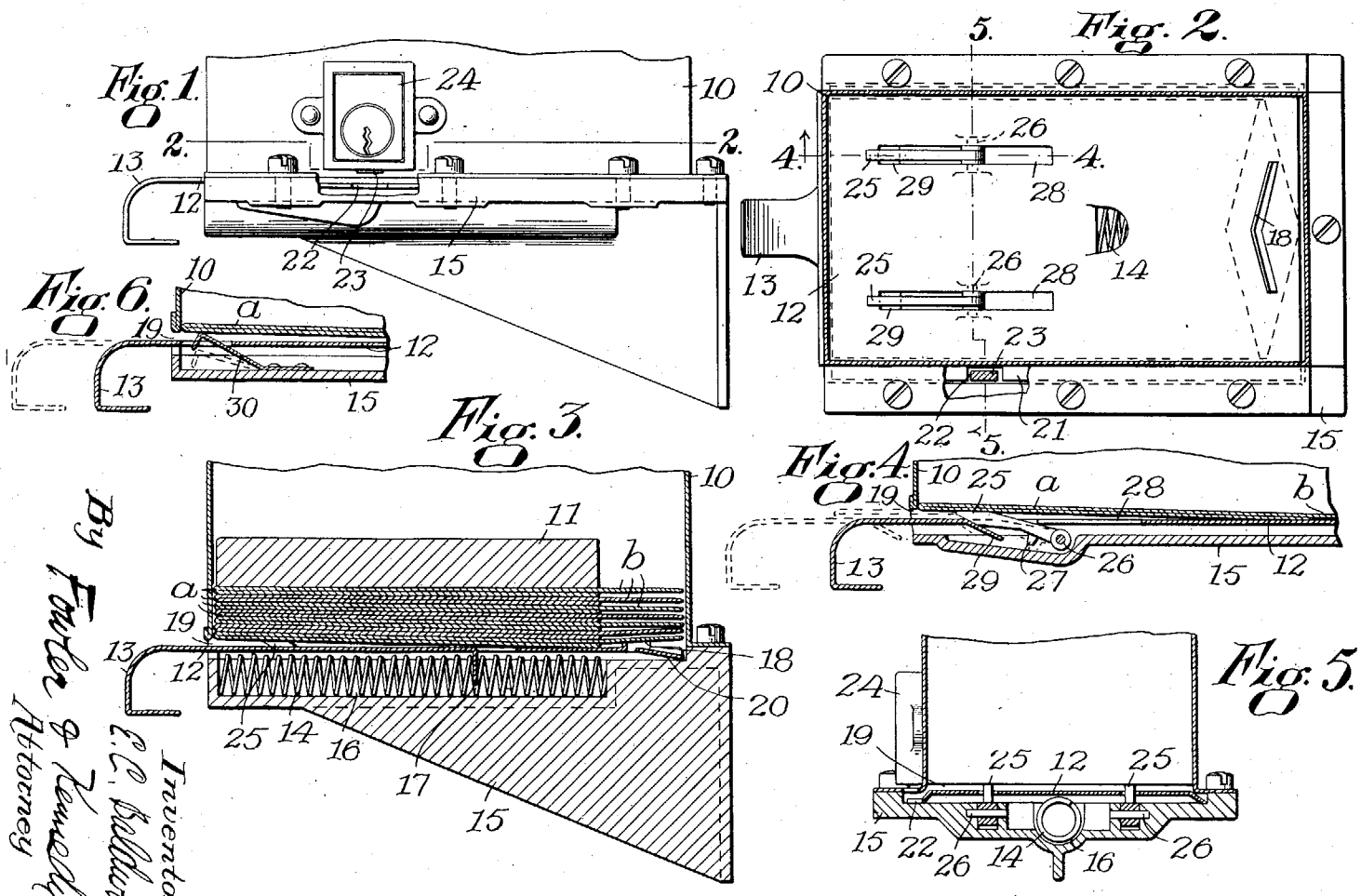
Inventor
E. C. Baldwin
By Fowler & Kennedy
Attorney
THE NORRIS PETERS CO. PHOTO-LITHO., WASHINGTON, D. C.

UNITED STATES PATENT OFFICE.

EDWARD C. BALDWIN, OF BOSTON, MASSACHUSETTS.

PAPER-CUP DISPENSER.

14,209. Specification of Reissued Letters Patent. Reissued Oct. 31, 1916.

Original No. 1,110,034, dated September 8, 1914, Serial No. 652,674, filed October 3, 1911. Application for reissue filed August 2, 1916. Serial No. 112,854.

*To all whom it may concern:*

Be it known that I, EDWARD C. BALDWIN, a citizen of the United States, residing at Boston, in the county of Suffolk and Commonwealth of Massachusetts, have invented certain new and useful Improvements in Paper-Cup Dispensers, of which the following is a specification.

This invention relates to apparatus for removing articles one at a time from a holder or magazine for a large number of such articles, and refers particularly to devices of this character especially adapted to remove a relatively thin or flat article from the bottom of a pile of such articles.

One of the objects of the invention is to provide a dispensing mechanism especially adapted for use in coin controlled vending machines which will with certainty engage and remove one and only one of a pile or stack of relatively thin or flat articles, as for instance postal cards, envelops, pieces of confectionery, or collapsed paper drinking cups, which latter may, for example, be of the character illustrated and described in my application Serial No. 613,663, filed March 10, 1911; it will be clear, however, that my invention is not in any sense confined in its use to articles of this or any other particular type.

Another object is to provide a device of this character having means which can be locked to prevent operation of the actuating slide.

A further object is to provide means whereby, when the device is locked, an article cannot be removed therefrom. This feature, as applied to a coin-controlled machine for vending the articles, where the ejecting slide is automatically held from operation until the deposit of a coin to release the same takes place, insures against the "picking" of the machine, by the unauthorized or surreptitious removal of any of the articles through the delivery opening thereof, by means of any instrument inserted from the outside into said opening.

To these ends the invention consists in the improvements which I will now proceed to describe and claim.

Of the accompanying drawings, Figure 1 is a side elevation of so much of the apparatus as is necessary to illustrate the invention, a side portion of the base being broken out. Fig. 2 represents a section on line 2—2, of Fig. 1, and indicating one of the cups that is to be dispensed, by dotted lines. Fig. 3 represents a substantially central section from front to rear. Fig. 4 represents a section on line 4—4, of Fig. 2. Fig. 5 represents a section on line 5—5, of Fig. 2. Fig. 6 is a view similar to a portion of Fig. 4, but illustrating a modification.

Similar reference characters indicate the same or similar parts in all of the views.

A box like receptacle or holder 10 is provided, the same being rectangular in horizontal transverse section, and internally of a size to just receive a pile of the cups *a* which are placed in said receptacle with their projecting end lips uppermost. The cup is formed with a projecting lip *b* which is of one thickness, while other parts of the cup are two or more layers thick. As a matter of fact, each cup has some overlapping portions which comprise four layers or thicknesses; but for the present purposes it is sufficient to state that each cup of the type for which the present ejecting mechanism is designed has one side longer than the other, resulting in the end of the longer side constituting a lip *b*. The result of this is that when the cups are arranged in the holder as indicated in Fig. 3, there will be practically no pressure upon those portions of the cups which comprise the lips. When the holder is full or nearly so, of course the upper cups of the pile exert sufficient pressure upon the bottom cup, but in order that there will be sufficient pressure even until there is but one cup left in the holder, I preferably employ a weight such as indicated at 11, said weight being so arranged as to cause no downward pressure upon the lips of the cups. In the dispensing of thin paper articles, heretofore it has been difficult to insure the proper engagement of the pusher with just one article, but by means of the mechanism presently described, one cup and only one can be engaged so as to be pushed out. This mechanism comprises a slide 12 which forms the bottom or surface on which the pile of blanks rest, said slide having a finger pull 13, a spring 14 being employed to normally retain the slide in the position shown in Fig. 3. This slide, as shown by comparing Figs.

2 and 3, has an area to entirely support the cups so that no portion of the bottom cup, when being drawn outwardly, will be dragged over any stationary surface. Therefore there is no liability of tearing or mutilating the cup, and said cup can be easily removed. As presently described, the pusher 18 is upright and is so positioned as to engage only the rear edge portion of the lower layer or half of the bottom cup, and does not enter between the layers or halves of the cup to engage any other portion of such cup.

The holder and its slide are supported upon a suitable base 15, which may be in the form of a bracket whereby it may be secured to a wall or secured otherwise in fixed position. The base is formed with a channel 16 in which the spring 14 is mounted and confined between one end of said channel and a lug 17 which latter may be a lip bent downwardly from the sheet of metal which comprises the slide 12. The rear end of the slide is provided with a shoulder or lug or upright 18 to constitute a pusher to engage a portion of the bottom cup. Said pusher is located in such position relatively to the length of the slide that it cannot move back far enough to get beyond the edge of the lip *b* of the cup, and consequently when the slide is drawn forward, the pusher engages the rear edge of the shorter side of the cup under the lip and causes the other end of the cup which is the bottom of the cup when in use, to be ejected far enough so that the thumb of the same hand which operates the slide can be placed upon the ejected cup which may be easily withdrawn through the front or delivery slot. To provide such slot, there is a slight space between the forward edge of the slide and the lower edge of the front wall of the holder as shown at 19.

The pusher lug 18 is preferably somewhat angular as shown in Fig. 2, to correspond with the edge of the shorter side of the cup so that said pusher will contact with a sufficiently extended portion of said edge to perform its function of ejecting the cup without liability of bending or breaking the thin paper. In other words, the pusher has its acting portion irregularly formed so as to continuously engage a correspondingly shaped portion of the article. The shape of the article, a paper drinking cup, is indicated by the dotted lines in Fig. 2. The reentrant angle indicated by the dotted line adjacent the left hand edge or surface of the pusher 18 indicates the shape of the edge of that side of the cup which is shorter than the other side, said pusher, as shown in Fig. 3, being underneath only that portion of the cup which forms the lip *b* of single thickness. When the holder contains a large number of the cups, the weight of the pile causes such a pressure on the lower cup as to cause considerable frictional resistance to the ejection of said lower cup. Consequently, if the pusher did not correspond in outline to the edge which is to be engaged for ejecting purposes, the action of the pusher would be practically certain to mutilate the edge of the paper cup. Moreover, the articles, to insure their free delivery must be somewhat loose laterally within the holder 10. That is, there must be a free space between the side edges of the cups and the inner walls of the holder. By having the pusher correspond to the edge of the cup which is engaged by said pusher, the action of the pusher in ejecting the cup steadies and directs the cup through the slot 19 in a straight line without liability of the cup swinging so that its other end would be liable to bind and resist ejection. It is to be understood, of course, that the paper is much thinner than indicated in Figs. 3 and 4, the thickness shown in said figures being for purposes of clearer representation. Said pusher or lug 18 is conveniently made by slotting a portion of the slide 12 and bending up one edge.

The rear portion of the slide is preferably bent or inclined downwardly as indicated at 20 in Fig. 3, so that the extreme rear edge will bear upon the upper surface of the base 15, in order to support the rear portion of the slide in its reciprocating motions. The reason for having the lug 17 engaging an intermediate portion of the spring 14 is so that the portion of the spring behind said lug may serve somewhat as a cushion to prevent the slide from being noisy when stopped after a cup dispensing operation.

One side edge 21 of the slide 12 is provided with a notch or keeper 22 (Figs. 2 and 5) for a bolt 23, which latter is controlled by suitable key controlled mechanism of a lock, the casing of which is indicated at 24 (see also Fig. 1).

Whenever it may be desired to put the apparatus out of commission the bolt may be projected into the keeper 22 so that the slide can not be withdrawn. When this is done, it is desirable that it shall not be possible to remove a cup by inserting some instrument through the delivery slot 19. For this purpose I provide one or more lifters 25, pivoted at 26 and each having a lug 27, which will limit the downward movement by contact with the bottom of the recess of base 15 in which the lifter is pivoted. Said lifters project through slots 28 in the slide 12, the material of the slide at one end of each slot 28 being bent in a rearwardly and downwardly inclined direction to constitute actuators that will raise the lifters 25 whenever the slide moves from the dotted line position of Fig. 4 to the full line position of that figure, said actuators 29 engaging the tips of the lifters 25 and positively forcing the latter upwardly so that they will elevate the paper cups to a plane above the delivery slot 19. As indicated in Fig. 2, the pusher 18 is so located relatively to the length of the slide 12, that when the slide is withdrawn, it can move far enough to remove the actuators 29 from the lifters 25 sufficiently to permit the latter to move downwardly and let the cups move downwardly so that the edge of the lowermost cup will be in position to emerge through the delivery slot 19 by the time the pusher 18 reaches the edge of the shorter side of the cup. Of course as soon as the slide is pulled out to substantially the position shown by dotted lines in Fig. 4, the thumb or one finger of the hand can be used to take hold of the projecting portion of the partially ejected cup and pull that cup completely out. When the slide is released, the spring 14 returns it and the actuating inclines 29 reëngage the lifters 25 and restore the cups to the slightly raised position indicated in Figs. 3 and 4.

As indicated in Fig. 6, the lifters, instead of being pivoted, may be springs secured to the base 15 and having upwardly inclined portions 30 adapted to be engaged by the rear ends of the slots 28 when the slide is pulled forward, so as to positively lower said springs. When the slide is returned to normal position, the springs rise through the slots and raise the lowermost cup above the delivery slot. Briefly stated, the difference in operation is that the lifters 30 move upwardly by their own resilience instead of being carried upwardly by the resilience of spring 14 in the other structure illustrated acting through the inclines 29.

In order that the apparatus may be easily put out of commission, without removing the cups from the holder, the bottommost cup, or any one of them at a predetermined number from the bottom, may be reversed. It is essential of course that the cups shall be placed in the holder with their bottoms or closed ends adjacent the wall which has the slot 19. A cup cannot be projected through the slot unless its longer side is uppermost to enable the lug or projection 18 to engage the edge of the shorter side, as shown by comparing Figs. 2 and 3, the shape of the cup being indicated by dotted lines in Fig. 2. If a cup is reversed or in other words placed in the holder upside down, such cup could not be projected because the lug or projection 18 would simply reciprocate against the surface of the longer side of that cup, which surface would then be turned downwardly. If the owner of the apparatus wishes to prevent any more of the cups from being removed, he simply unlocks the holder and turns the lowermost cup upside down. If he wishes to limit the number of cups which can be withdrawn by his employees, or others, he can select any cup above the bottom and reverse that one. For instance, if he reverses the eleventh or the fifty-first cup from the bottom, only ten cups or fifty cups respectively can be successively obtained. He does not have to take the cups out of the holder to put it out of commission. The holder can be stocked full and only a predetermined number dispensed, by simply reversing any cup so that its shorter side will be uppermost.

It is to be understood of course, that the slide 12 may be locked or released by means of suitable coin-controlled mechanism, but since such would constitute a separate invention from the dispensing apparatus, I do not illustrate coin-controlled mechanism in the drawing.

I claim—

1. An apparatus of the character described, comprising a holder to contain a pile of flat paper cups, said holder fitting the pile to prevent edgewise movement thereof and having a delivery slot for the lowermost cup, a slide having a pusher at a distance from the rear wall of the holder whereby said pusher cannot engage the rearmost portion of the cup, means for actuating said slide, and means for automatically raising the lowermost cup above the delivery slot when the slide is in normal position.

2. An apparatus of the character described, comprising a holder for a pile of blanks, said holder having a delivery slot, a slide for supporting the pile of blanks and having a pusher, lifters to raise the lowermost blank above the delivery slot when the slide is in its rear position, and means for permitting said lifters to drop at the beginning of the outward movement of the slide.

3. An apparatus for dispensing elongated paper cups which are closed at one end and have one side longer than the other to form a projecting lip, said apparatus comprising a holder for a pile of the cups, the holder having a delivery slot, and a slide having a pusher near its rear end in position to bear against the inner face of a cup lip without sliding the cup, whereby outward movement of the slide will cause said pusher to engage the edge of the shorter side of the cup and slide said cup bottom first out through said slot, said pusher having its acting portion irregularly formed to continuously engage a correspondingly shaped edge of said shorter side of the cup.

4. In a machine of the class described, a magazine for containing vendible articles in a vertical stack, said magazine being at its lower end provided with a delivery opening, means at the bottom of said magazine for normally supporting the forward end of the lowermost article above said delivery-opening, ejector mechanism operable to eject the articles through said delivery-opening, and means whereby the operation of said ejector mechanism causes automatic lowering of said supporting means to bring the forward end of the lowermost article in alinement with said delivery-opening.

5. In a machine of the class described, a casing adapted to contain vendible articles in a vertical stack, said magazine being at its lower end provided with a delivery-opening, means at the bottom of said magazine for normally supporting the forward end of the lowermost article above said delivery-opening, ejector mechanism operable to eject the articles through said delivery-opening, and means carried by said ejector mechanism to hold said supporting means in its normal position, said means carried by the ejector mechanism causing said supporting means to drop automatically during the operation of said mechanism sufficiently to bring the forward end of the lowermost article into alinement with said delivery-opening.

6. In a machine of the class described, a magazine provided with a delivery opening adapted to contain a stack of vendible articles, means for normally holding the forward end of the article next to be delivered out of alinement with said delivery opening, ejector mechanism operable to eject the articles through said delivery opening, and means carried by said ejector mechanism to maintain said holding means in its normal position, said means carried by the ejector mechanism causing automatic adjustment of said holding means to bring the forward end of the article engaged by the ejector mechanism into alinement with said delivery-opening.

7. In a machine of the class described, a magazine adapted to contain vendible articles in a vertical stack, said magazine being at its lower end provided with a delivery-opening, means at the bottom of said magazine for normally supporting the forward end of the lowermost article above said delivery-opening, a slidable ejector having means at the rear end for engaging the lowermost article to eject the same through said delivery-opening, and means at the forward end of said ejector to hold said supporting means in its normal position when the ejector is in unoperated position, said holding means on the ejector automatically releasing said supporting means and allowing the same to drop when the ejector is operated, whereby the forward end of the lowermost article is brought into alinement with the delivery opening.

8. In a machine of the class described, a magazine adapted to contain vendible articles in a vertical stack, said magazine being at its lower end provided with a delivery opening, a slidable ejector at the bottom of said magazine for ejecting the articles through said delivery-opening, a supporting member pivoted at its rear end at the bottom of said magazine, the forward end of said member being arranged in proximity to said delivery-opening, the stack of articles thus resting at the forward end on said supporting member, and means carried by the ejector for holding said member raised when the ejector is in its unoperated position, whereby the forward end of the lowermost article is normally above the delivery-opening, said holding means on the ejector automatically releasing said member, and allowing it to rock when the ejector is operated, so that the forward end of the lowermost article is brought into alinement with the delivery-opening.

9. In a machine of the class described, a magazine provided with a delivery opening at the bottom, a support arranged at the bottom of the magazine for supporting a stack of vendible articles, means for ejecting the articles through said delivery-opening, and means for automatically lowering said support during the operation of said ejecting means to permit the ejection of the articles.

10. In a machine of the class described, a magazine provided with a delivery-opening at the bottom, a pivoted support at the bottom of the magazine for supporting a stack of vendible articles, means for ejecting the articles through said delivery-opening, and means for automatically rocking said support downwardly during the operation of said ejecting means to permit the ejection of the article.

11. In a machine of the class described, provided with a magazine for containing vendible articles, means at the bottom of the magazine for normally supporting the articles above the delivery opening, a slidable ejector provided at its forward end with means for coöperating with said supporting means to permit the delivery of the articles when the ejector is operated.

12. In a machine of the class described, a magazine for containing a stack of vendible articles and provided with a delivery opening, mechanism for ejecting said articles through said delivery opening, and means controlled by said mechanism for automatically shifting the entire stack of articles relatively to said delivery opening at the beginning and at the end of each ejecting operation.

13. In a machine of the class described, a magazine for containing a vertical stack of vendible articles and provided with a delivery opening at the bottom, mechanism for ejecting said articles from said delivery opening, and means controlled by said mechanism for automatically lowering the entire stack of articles at the beginning of each ejecting operation to cause the lowermost article to pass through said delivery opening, said means automatically raising the stack at the end of each ejecting operation.

Dated this 28th day of July, 1916.

EDW. C. BALDWIN.

Witnesses:

GEO. H. VARNEY,

OLIVE L. BOYD.

Copies of this patent may be obtained for five cents each, by addressing the "Commissioner of Patents, Washington, D. C."